Sept. 15, 1970  W. G. CROSS  3,528,248
GAS TURBINE ENGINE
Filed July 1, 1968  4 Sheets-Sheet 1
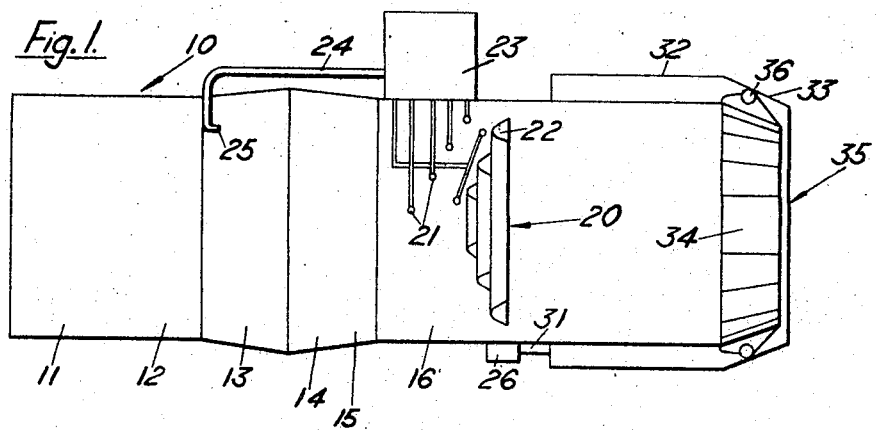
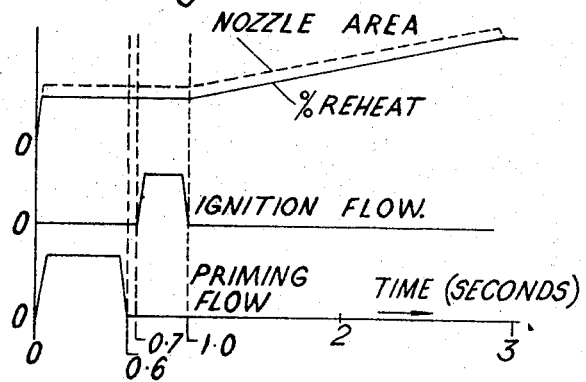
Inventor
WALTER GEORGE CROSS
By
Cushman, Darby & Cushman
Attorneys

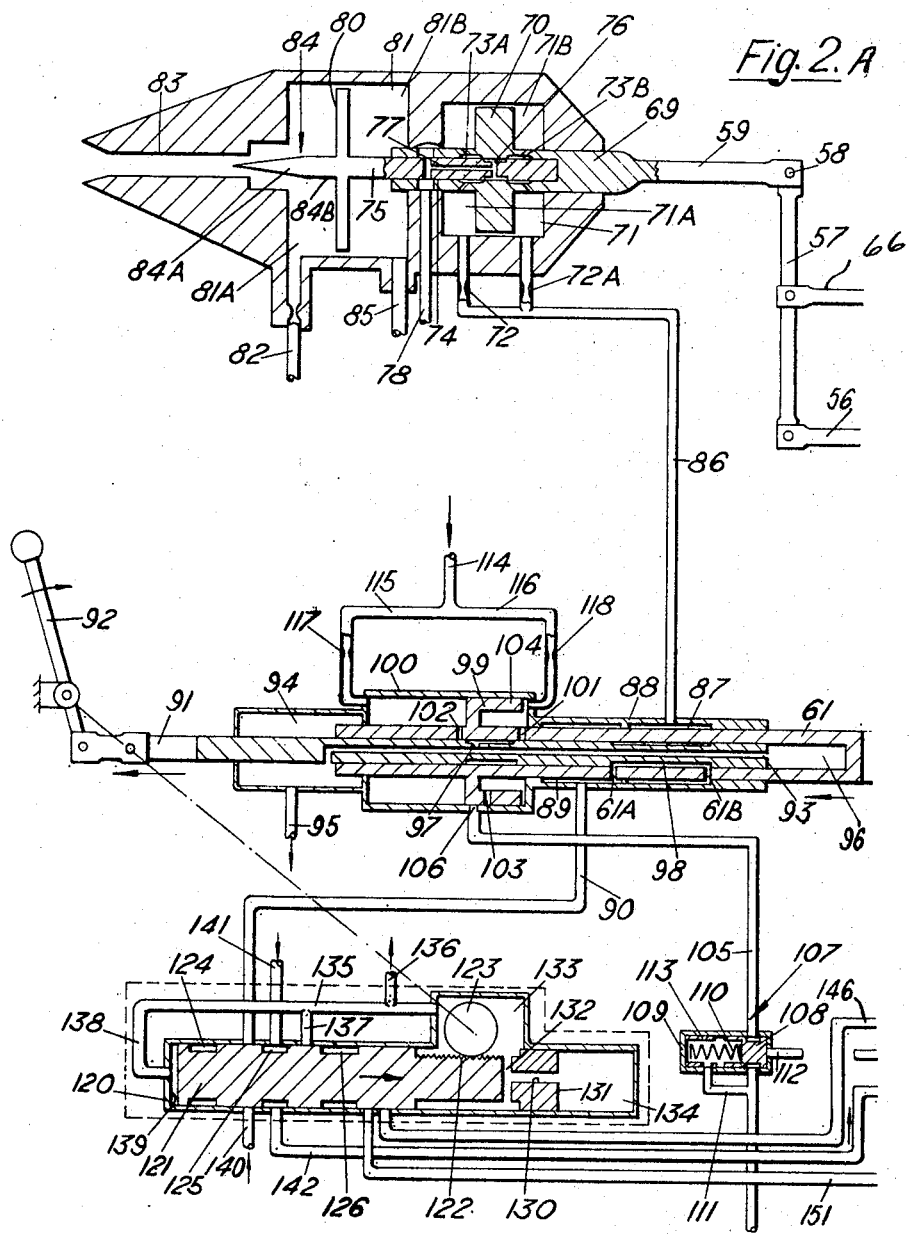

Sept. 15, 1970   W. G. CROSS   3,528,248
GAS TURBINE ENGINE
Filed July 1, 1968   4 Sheets-Sheet 3
Fig. 2.B
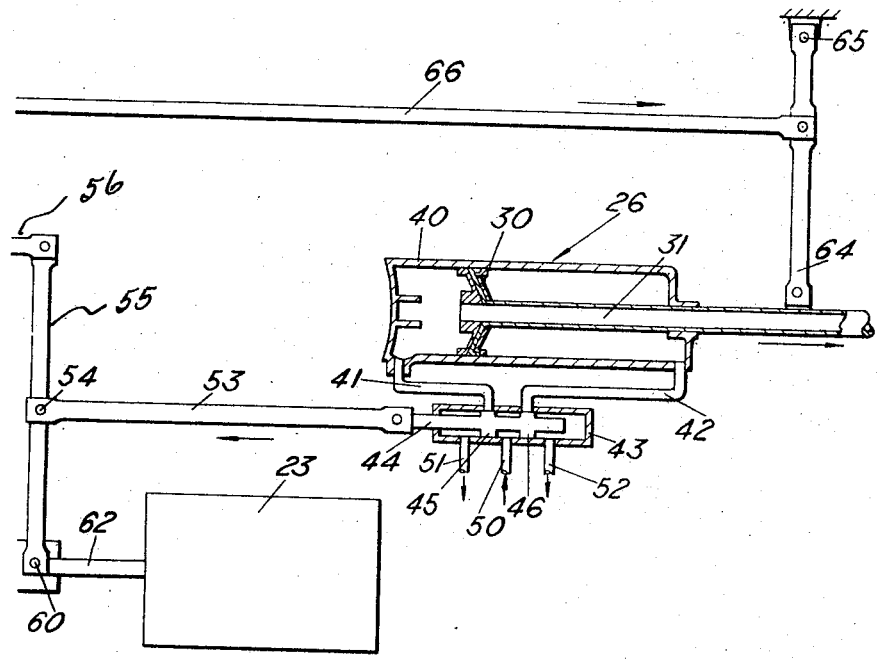
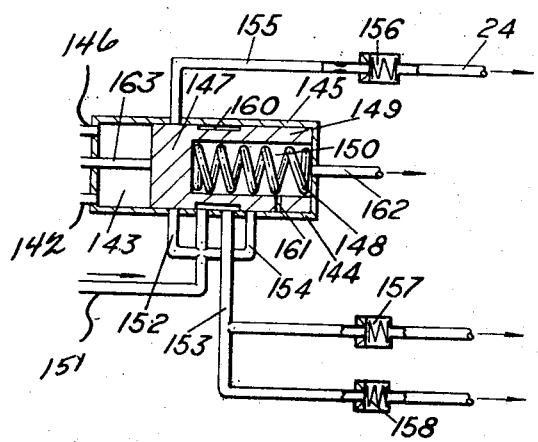
Inventor
WALTER GEORGE CROSS
By
Cushman, Darby & Cushman
Attorney Sept. 15, 1970          W. G. CROSS          3,528,248
GAS TURBINE ENGINE
Filed July 1, 1968          4 Sheets-Sheet 4
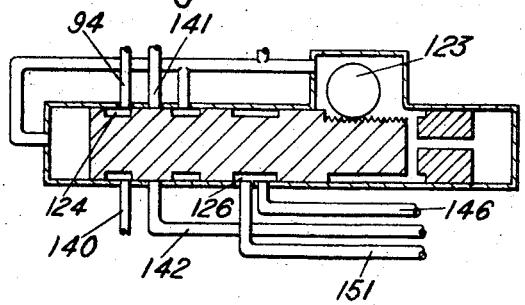
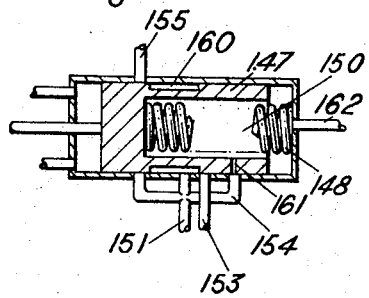
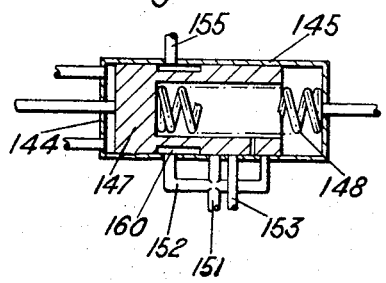
Inventor
WALTER GEORGE CROSS
By
Cushman, Darby & Cushman
Attorneys United States Patent Office 3,528,248
Patented Sept. 15, 1970

3,528,248
GAS TURBINE ENGINE
Walter George Cross, Mickleover, Derby, England, assignor to Rolls-Royce Limited, Derby, England, a British company
Filed July 1, 1968, Ser. No. 741,569
Claims priority, application Great Britain, July 4, 1967, 30,817/67
Int. Cl. F02k 1/16, 1/18, 3/10
U.S. Cl. 60—235
19 Claims

ABSTRACT OF THE DISCLOSURE

The invention concerns a gas turbine engine having a jet pipe, reheat combustion equipment mounted in said jet pipe, a variable area nozzle mounted at the downstream end of the jet pipe, a power-operated device for varying the area of the nozzle, a pressure responsive device which normally controls operation of the power-operated device and which is adjusted in functional dependence upon the value of the jet pipe pressure, fuel supply means for supplying fuel to the reheat combustion equipment, a manually operable member for controlling operation of the fuel supply means, and control means, effective only during a predetermined period initiated by predetermined movement of the manually operable member, for preventing the pressure responsive device from controlling operation of the power-operated device and for ensuring that the latter is controlled by means of the said manually operable member.

This invention concerns a gas turbine engine.

When it is desired to bring reheat combustion equipment of a gas turbine engine into operation, it is necessary to effect rapid opening of the variable area nozzle if the latter is not to be damaged. If, however, the area of the variable area nozzle is adjusted by a pressure responsive device in functional dependence upon the value of the jet pipe pressure, it may not be possible for the said pressure responsive device to open the nozzle sufficiently quickly, e.g. during a "slam acceleration."

According to the present invention, there is provided a gas turbine engine having a jet pipe which is provided with reheat combustion equipment and with a variable area nozzle, a power-operated device for varying the area of the nozzle, a pressure responsive device which normally controls operation of the power-operated device and which is adjusted in functional dependence upon the value of the jet pipe pressure, fuel supply means for supplying fuel to the reheat combustion equipment, a manually operable member for controlling operation of the fuel supply means, and control means, effective only during a predetermined period initiated by predetermined movement of the manually operable member, for preventing the pressure responsive device from controlling operation of the power-operated device and for ensuring that the latter is controlled by means of the said manually operable member.

The said predetermined movement may be constituted by, or may include, movement of the manually operable member in a direction to establish or increase the supply of fuel to the reheat combustion equipment, the area of the nozzle, throughout the said predetermined period, being greater than it would be if it remained under the control of the pressure responsive device. The said predetermined movement may thus, for example, be constituted either by any movement of the manually operable member or by movement of the manually operable member only in the said direction.

The pressure responsive device is preferably responsive to the ratio of pressures which are respectively functionally related to the jet pipe pressure and to a pressure prevailing in the compressor of the engine.

The pressure responsive device may control the power-operated device by way of a servo device, the control means rendering the servo device inoperative during a said predetermined period. Thus the servo device may be pressure fluid operated, the control means comprising a shut-off valve in a pressure fluid supply line leading to the servo device, the said shut-off valve being closed throughout the said predetermined period. The shut-off valve may be constituted by first and second parts which are respectively connected to the manually operable member and to the power-operated device, movement of the first part urging a servo member to adjust the second part until the latter has moved to the same extent and in the same sense as the first part.

Movement of the manually operable member from a first position, in which no fuel is supplied to the reheat combustion equipment, to a second position, in which fuel is supplied to the reheat combustion equipment, may cause priming of the said reheat combustion equipment with fuel and subsequent ignition of the said fuel. There is preferably an interval between the said priming and the said ignition.

There may be provided in this connection a reservoir, means for filling the reservoir with a predetermined quantity of fuel whenever the manually operable member is in the first position, and means for passing fuel from said reservoir to effect the said priming and the said ignition whenever the manually operable member is moved from the said first position to the said second position.

The reservoir may comprise a cylinder having a piston slidable therein, there being provided means urging the piston towards one end portion of the cylinder, through which end portion the reservoir may be filled with the said quantity of fuel, and there being provided ducting leading from the said end portion to other portions of the cylinder, which other portions, when the piston is in certain positions, respectively communicate with conduits leading to an ignition unit and to the reheat combustion equipment.

There may be a valve member which permits flow through the ducting and towards the said other portions only when the manually operable member is in the said second position, movement of the manually operable member effecting movement of the valve member.

When the manually operable member is in the first position, it may establish communication between two fuel conduits to permit the latter to supply fuel to the reservoir.

Preferably, means are provided for preventing the full flow of fuel to the reheat combustion equipment being established until the said priming and ignition has occurred. Thus the last mentioned means may prevent the servo member from fully adjusting the said second part of the shut-off valve until the said priming and ignition has occurred. The said last mentioned means may comprise a normally open trip valve in a drain conduit the trip valve being closed by the said piston when the latter is at the said one end of its cylinder.

The invention is illustrated, merely by way of example, in the accompanying drawings, in which:

FIG. 1 is a diagrammatic view of a gas turbine engine according to the present invention, FIG. 2 are split views of a diagrammatic sectional view of part of the structure of the engine of FIG. 1, FIG. 3 shows part of the structure of FIG. 2, but with portions thereof in a different relative position from that shown in FIG. 2, FIGS. 4 and 5 show another part of the structure of FIG. 2, but with portions thereof in two different relative positions from that shown in FIG. 2, and FIG. 6 is a graph illustrating the operation of the engine of the present invention.

The terms "left" and "right" as used in the description below are to be understood to refer to directions as seen in the drawings.

In FIG. 1 there is shown a gas turbine engine 10 which is adapted for use as a forward propulsion engine of an aircraft and which comprises, in flow series, a low pressure compressor 11, a high pressure compressor 12, main combustion equipment 13, a high pressure turbine 14, a low pressure turbine 15, and a jet pipe 16.

Reheat combustion equipment 20 is mounted in the jet pipe 16 and includes main burners 21 and pilot burners 22, the burners 21, 22 being supplied with reheat fuel from a fuel supply control unit 23. The fuel supply control unit 23 may control the supply of reheat fuel in accordance with a number of engine variables.

Fuel may also be supplied through a line 24 to an ignition unit 25 which may, for example, be constituted by "hot streak" injectors. Fuel supplied to these hot streak injectors passes through the main combustion equipment 13 and thence through the turbines 14, 15 as a "hot streak" to ignite reheat fuel supplied to the pilot burners 22.

A plurality of fluid power-operated, double action, nozzle adjustment rams 26 are mounted about the jet pipe 16. Thus there may, for example, be six such rams 26, although in order to simplify the drawings, only one such ram is shown in FIGS. 1 and 2. The operation of this particular ram 26 will therefore be described, it being understood that the operation of the remaining rams 26 is identical.

The ram 26 has a piston 30, (FIG. 2), the piston rod 31 of which is connected to an axially movable sleeve 32 (FIG. 1) which is mounted concentrically about the downstream end of the jet pipe 16. The sleeve 32 has a frustoconical downstream end 33 which tapers in a downstream direction. The downstream end of the jet pipe 16 is provided with a plurality of pivotally mounted nozzle members or "fingers" 34 which collectively constitute a variable area nozzle 35. Each of the nozzle members 34 is provided with a roller 36 which engages the internal surface of the downstream end 33 of the sleeve 32.

When the ram 26 causes axial movement to the sleeve 32 in a downstream direction, the nozzle members 34 will be able to move radially outwardly under the pressure of the exhaust gases in the jet pipe 16 so as to increase the effective area of the nozzle 35, while axial movement of the sleeve 32 in an upstream direction will force the nozzle members 34 radially inwardly by a camming action of the sleeve 32 on the rollers 36, so as to decrease the effective area of the nozzle 35.

The piston 30 is slidable within a cylinder 40 opposite ends of which communicate by way of pipes 41, 42, with the interior of a cylindrical valve body 43. Slidably mounted within the valve body 43 is a spool valve 44 having lands 45, 46. When the spool valve 44 is moved in either direction away from the central position shown in FIG. 2, high pressure fuel, which may enter the valve body 43 through a pipe 50, may pass to one of the pipes 41, 42. The other of the pipes 41, 42 will, at this time, communicate with either a pipe 51 or a pipe 52 leading to drain, (i.e. to a source of low pressure fuel). Thus whenever the spool valve 44 is away from the said central position, the piston 30 is moved.

The spool valve 44 is pivotally connected to one end of a link 53 whose other end is connected at a pivot 54 to the centre of (or to some other point on) a lever 55. One end of the lever 55 is pivotally connected to an end of a link 56 whose other end is pivotally connected to a lever 57, the lever 57 being connected, at its end remote from the link 56, to a pivot 58 carried by a rod 59.

The end of the lever 55 remote from the link 56 is pivotally connected at a pivot 60 to one end of a sleeve 61. The sleeve 61 is provided, at its said end, with a rod 62 which effects adjustment (by means not shown) of the output of the fuel supply control unit 23.

The piston rod 31 is pivotally connected to one end of a link 64 whose opposite end is connected to a pivot 65 mounted in a fixed structure. The lever 57 and link 64 are interconnected by a mechanical or hydraulic link 66.

As will be appreciated, if the link 53 is moved towards the left, by means hereinafter described, high pressure fuel will pass from the pipe 50 to the pipe 41 and the piston 30 will thus be moved towards the right forcing fuel out through the pipe 42 and the pipe 52. This rightward travel of the piston 30, however, will cause similar rightward travel of the link 66 and, if the pivot 58 is stationary at this time, there will be similar rightward movement of the link 56. The link 53 will thus also be moved in a rightward direction and will continue to be so moved until the spool valve 44 is restored to the central position shown in FIG. 2, when movement of the piston 30 will cease.

The rod 59 is connected, integrally or otherwise, to an axially movable rod 69 forming part of a double acting slave piston 70. The slave piston 70 is mounted for axial sliding movement in a cylinder 71, opposite faces of the piston 70 being of equal area and dividing the cylinder 71 into spaces 71A, 71B. Both the spaces 71A, 71B are supplied with high pressure fuel through respective lines 72, via respective feed restrictors 72A, from a fuel pump (not shown) of the engine 10.

The spaces 71A, 71B communicate, via respective drillings, with respective axially spaced apart annular recesses 73A, 73B, which are provided in the internal surface of a central cylindrical bore 74 extending axially within the slave piston 70 from the end thereof remote from the rod 59.

A cylindrical stem 75 is a fluid tight sliding fit in the bore 74, the stem 75 having on its external surface an annular recess 76 which communicates by way of an internal drilling 77 with a low pressure fuel line 78.

The stem 75 carries a double acting master piston 80 which is mounted for sliding movement in a cylinder 81 which is co-axial with and axially spaced from the cylinder 71, but is sealed therefrom. The master piston 80 has opposite faces of equal area which divide the interior of the cylinder 81 into spaces 81A, 81B. The space 81A is supplied with compressed air from a conduit 82 at a pressure equal to, or functionally related to, the compressor delivery pressure $P_3$ of the engine 10. The space 81B is supplied, via a conduit 85, with gas at a pressure equal to, or functionally related to, the pressure $P_6$ prevailing in the jet pipe 16 of the engine 10. Thus the master piston 80 is adjusted in functional dependence upon the value of the jet pipe pressure or, more exactly, is adjusted in accordance with the ratio $P_3/P_6$.

The space 81A is vented to atmosphere through an axially extending cylindrical duct 83. The entrance from the space 81A to the duct 83 is partly obturated by a needle valve 84 secured to and extending axially from the master piston 80. The needle valve 84 has, at its outer end, a conical portion 84A which is normally disposed at the entrance to the duct 83, and a cylindrical portion 84B which is adjacent to the said conical portion.

Axial movement of the master piston 80 causes one or other of the spaces 71A, 71B to be brought into communication with the low pressure fuel line 78, thus causing the pressure in that space to fall relative to that in the other space and causing the slave piston 70 to move accordingly. The slave piston 70 therefore follows the movement of the master piston 80.

The slave piston 70 is thus, as will be appreciated, a servo piston whose position is exactly dictated by the master piston 80 whose position is in turn dictated by the value of the ratio $P_3/P_6$. Thus whenever the slave piston 70 is operative to move the rod 59 and hence the spool valve 44, the nozzle 35 will be controlled in functional dependence upon the value of the ratio $P_3/P_6$. In effect, the master piston 80 acts as a sensing piston and moves axially in response to changes in the ratio between the jet pipe pressure $P_6$ and a datum pressure, in this case the compressor delivery pressure $P_3$.

The arrangement will be seen to be such that should the jet pipe pressure $P_6$ increase, as a result of reheat being selected, the master piston 80 will move to the left, causing the slave piston 70 to move to the left also. As the master piston 80 moves to the left in its cylinder 81, the restriction provided by the conical portion 84A of the needle valve 84 increases, thereby increasing the pressure in the space 81A in opposition to the movement of the piston 80 and providing in effect a negative positional feed-back. When however, a rapid increase in the jet pipe pressure $P_6$ takes place, for example, on applying full reheat power during a "slam acceleration," the piston 80 moves to the left to a sufficient extent to bring the cylindrical portion 84B within the entrance to the duct 83. The effective flow restriction provided by the needle valve 84 is then independent of the axial position of the master piston 80 and the latter is therefore able to move rapidly to the left causing similar movement of the slave piston 70 and resulting in rapid opening of the nozzle 35.

The passages 72 communicate with a pressure fluid supply line 86. The latter communicates with an annular space 87 which is provided internally of a cylinder 88, the space 87 being located between the wall of the cylinder 88 and the sleeve 61 which is axially slidable in the cylinder 88. The sleeve 61 has radial drillings 61A, 61B of which the drilling 61B communicates with the annular space 87 while the drilling 61A communicates with an annular space 89 which is also provided between the sleeve 61 and the cylinder 88. The space 89 communicates with a pressure fluid supply line 90.

Mounted for axial sliding movement within the sleeve 61 is a rod 91 which is pivotally connected at one end to a manually operable and pivotally mounted pilot's lever 92.

The rod 91 has a passage 93 which extends axially therethrough, one end of the passage 93 communicating via a radial drilling with the interior of a cylinder 94 which has a drain passage 95 leading to a source of low pressure fuel. The opposite end of the passage 93 communicates with a space 96 within the sleeve 61. The rod 91 has a radial drilling 97 which communicates with the passage 93. The rod 91 also has a reduced diameter portion 98, the reduced diameter portion 98 having an axial length corresponding to the distance between the drillings 61A, 61B.

When the parts 61, 91 are as shown in FIG. 2, any high pressure fuel supplied to the pressure fluid supply line 90 may pass via the annular space 89, drillings 61A, 61B, and annular space 87 to the pressure fluid supply line 86, so as to render the slave piston 70 operative, i.e. positionable by the master piston 80. At such times, however, as the parts 61, 91 are displaced relatively to each other in either direction from the position shown in FIG. 2, the parts 61, 91 will act as a shut-off valve since high pressure fuel will not be able to pass from the pressure fluid supply line 90 to the pressure fluid supply line 86, and the slave piston 70 will therefore be rendered inoperative and hence incapable of positioning the piston 30 of the ram 26.

The sleeve 61 is provided with a piston 99 which is slidable in a cylinder 100, opposite sides of the piston 99 being of equal effective area. Radial drillings 101, 102 are provided in the sleeve 61 to the right and left respectively of the piston 99, the drillings 101, 102 extending to the interior of the sleeve 61, while a radial drilling 103 is provided through a skirt portion 104 of the piston 99.

A drain conduit 105 communicates with the interior of the cylinder 100 by way of a port 106. Flow through the drain conduit 105 is controlled by a trip valve 107, the latter having a valve member 108 which is slidable in a cylinder 109. The valve member 108 is normally urged towards the right, i.e. to the position shown in FIG. 2 in which it permits flow through the drain conduit 105, this being effected both by a spring 110 and by fuel pressure applied through a branch conduit 111. The latter establishes communication between the drain conduit 105 and the interior of the cylinder 109 to the left of the valve member 108.

The valve member 108 is, however, provided with a tappet 112 which, when moved to the left by means described below, moves the valve member 108 to a position in which it abuts an internal flange 113 within the cylinder 109 and in which it prevents flow through the drain conduit 105.

High pressure fuel may be provided from a line 114 and via lines 115, 116, which are respectively provided with restrictors 117, 118, to opposite sides of the piston 99. When the parts are positioned as shown in FIG. 2, the piston 99, will be stationary. If, however, the pilot's selection lever 92 is moved, in a clockwise direction to select reheat, the rod 91 will move towards the left and will bring the drillings 97, 102 into communication. High pressure fuel passing through the line 115 will thus pass through the drillings 102, 97 and axial passage 93 into the cylinder 94 and thus out through the drain passage 95. As a result, the pressure to the left of the piston 99 will be lower than that to the right thereof, and the piston 99, and hence the sleeve 61, will move towards the left, until the drilling 103 communicates with the port 106, when fuel supplied to the right of the piston 99 will pass out through the drain conduit 105 and the piston 99 will therefore cease moving. As a result of this movement, however, there will be some adjustment of the fuel supply control unit 23 by the rod 62 and thus some fuel will be supplied to the reheat combustion equipment 20. The fuel supply control unit 23 will not, however, be adjusted to supply the full flow of fuel to the reheat combustion equipment 20 until the valve member 108 has been moved towards the left to prevent flow through the drain conduit 105. When this occurs, there will be further movement of the piston 99 towards the left until the sleeve 61 and rod 91 are in the same relative position as that indicated in FIG. 2.

Similarly, if the pilot's selection lever 92 is moved counter-clockwise, the drillings 97, 101 will be brought into communication, and the piston 99 will move towards the right.

Thus, the piston 99 acts as a servo member which tends to adjust the sleeve 61 until the latter has moved to the same extent and in the same sense as the rod 91.

It will thus be noted that, whenver the pilot's selection lever 92 is moved, there is corresponding movement of the sleeve 61 and there is therefore adjustment both of the fuel supplied by the fuel supply control unit 23 and of the position of the spool valve 44 so as to cause the ram 26 to make an appropriate change to the area of the nozzle 35. Thus, during a predetermined period, e.g. of 3 seconds, which is initiated by the movement of the lever 92, the ram 26 is controlled by the lever 92. This is because during this period, i.e. until the parts 61, 91 are restored to the relative position shown in FIG. 2, fuel cannot pass from the pressure fluid supply line 90 to the pressure fluid supply line 86, and therefore the slave piston 70 is inoperative and the spool valve 44 cannot be moved thereby.

Throughout the time that reheat is employed, except, however, during the said predetermined period, the operation of the ram 26 will be controlled by the master piston 80 which is responsive to the pressure $P_3/P_6$.

The linkage constituted by the parts 53, 55, 56, 57, 64, 66 is such that, whenever the link 53 and hence the spool valve 44 are positioned by the pilot's selection lever 92 rather than by the slave piston 70, and hence throughout the whole of the said predetermined period, the area of the nozzle 35 is greater, e.g. by 10%, than it would be if it remained under the control of the master piston 80. This increased nozzle area is thus produced during all movement of the pilot's selection lever 92 although, if desired, it could be arranged that the increased nozzle area was produced only during movement of the pilot's selection lever 92 in the clockwise direction in which the supply of fuel to the reheat combustion equipment 20 is established or increased.

Accordingly, during the critical period following the selection of reheat, the nozzle 35 is adequately and swiftly opened, any additional opening of the nozzle beyond what is necessary being finally trimmed off by the piston 80 when the latter comes into effective operation on the restoration of the parts 61, 91 to the relative position shown in FIG. 2.

The pressure fluid supply line 90 communicates, at its end remote from the cylinder 88, with a valve body 120 within which there is mounted for axial sliding movement a valve member 121. The valve member 121 has a rack portion 122 which meshes with a pinion 123, the pinion 123 being moved upon movement of the pilot's selection lever 92. The arrangement is such that when the pilot's selection lever is moved clockwise, the valve member 121 is moved towards the right.

The valve member 121 is provided with circumferentially extending annular recesses 124, 125, 126. The valve member 121 is also provided with an axially extending passage 130 which extends from the end 131 of the valve member 121 to a radially extending passage 132 therein. The pinion 123 is housed within a space 133 within the valve body 120 and the arrangement is such that, when the valve member 121 is moved toward the right, fuel trapped in a space 134 to the right of the valve member 121 passes through the passages 130, 132 and space 133 into a conduit 135 which extends to a drain passage 136. The conduit 135 also has a branch conduit 137 which extends to a central portion of the interior of the valve body 120, and a branch conduit 138 which extends to an end 139 of the valve body 120. Thus fuel displaced by movement of the valve member 121 in either direction can be forced out to the drain passage 136.

When the parts are as shown in FIG. 2, the valve member 121 is so positioned as to prevent flow from a pressure fluid supply line 140, which is provided with a supply of high pressure fuel, to the pressure fluid supply line 90. The annular recess 125 is, however, at this time provided with high pressure fuel which flows thereto through a fuel conduit 141, this high pressure fuel then flowing by way of a fuel conduit 142 into a reservoir space 143 within and adjacent the left hand end portion 144 of a cylinder 145.

The reservoir space 143 may thus be filled with a quantity of fuel which enters through the end portion 144. Ducting 146 extends from the end portion 144 of the cylinder 145 and thus from the reservoir space 143. The ducting 146 extends to the interior of the valve body 120, but, when the valve member 121 is positioned as shown in FIG. 2, communication between the ducting 146 and the interior of the valve body 120 is prevented.

Slidably mounted in the cylinder 145 is a piston 147, the piston 147 being urged towards the end portion 144 of the cylinder 145, by means of a spring 148. The spring 148 is housed within a skirt portion 149 of the piston 147, the skirt portion 149 defining within the cylinder 145 a space 150.

Ducting 151 and conduits 152, 153, 154 and 155 communicate with various portions of the interior of the cylinder 145, the conduits 152 and 154 each communicating with the ducting 151. The conduit 155 communicates, by way of a non-return valve 156, with the line 24 leading to the ignition unit 25. The conduit 153 communicates, via non-return valves 157, 158, with the pilot burners 22 and with the main burners 21 respectively of the reheat combustion equipment 20.

The piston 147 is provided with a circumferentially extending annular recess 160 and with a drilling 161 which extends radially through the skirt portion 149. A drain passage 162 communicates with the space 150.

When the parts are in the position shown in FIG. 2, in which no fuel is supplied to the reheat combustion equipment 20, fuel will flow from the fuel conduit 141 and via the annular recess 125 and fuel conduit 142 to the reservoir space 143. Fuel will indeed continue to flow into the reservoir space 143 until the right hand end of the piston 147 engages the adjacent end wall of the cylinder 145. Excess fuel in the space 150 will at this time, be forced out through the drain passage 162.

A quantity of fuel will thus be introduced into the reservoir space 143 but this quantity of fuel will not be able to escape therefrom at this time because the valve member 121 prevents communication between the ducting 146 and the ducting 151. At this particular time, moreover, the valve member 121 prevents communication between the pressure fluid supply line 140 and the pressure fluid supply line 90 so that the slave piston 70 is rendered inoperative.

If, however, the pilot's selection lever 92 is moved clockwise to a position in which fuel is supplied to the reheat combustion equipment 20, the valve member 121 is moved by the pinion 123, to the position shown in FIG. 3. In this position, the fuel conduits 141, 142 no longer intercommunicate, but communication is established, via the annular recess 124, between the pressure fluid supply lines 140, 90, so that, at the end of the said predetermined period, the slave piston 70 will be operative.

In the FIG. 3 position, moreover, the annular recess 126 will establish communication between the ductings 146, 151. The spring 148 will therefore cause the piston 147 to force the quantity of fuel in the reservoir space 143 through the ductings 146, 151, and annular recess 160 to the conduit 153, and so to the burners 21, 22 to effect priming of the latter.

When, however, the spring 148 has moved the piston 147 from the FIG. 2 to the FIG. 4 position, the annular recess 160 will no longer communicate with the conduit 153 so that no further priming fuel will be supplied for priming the burners 21, 22. In the FIG. 4 position, moreover, the annular recess 160 will not as yet communicate with the conduit 155 so that no fuel will at this time be supplied to the ignition unit 25. The drilling 161 will, however, at this time communicate with the conduit 154, so that the fuel being forced through the ducting 151 will flow via the conduit 154, drilling 161, and space 150 to the drain passage 162.

After a discrete interval of time, however, (e.g. of 0.1 second) the piston 147 will have been moved by the spring 148 from the FIG. 4 to the FIG. 5 position. In this position, the ducting 151 will communicate, via the conduit 152 and the annular recess 160, with the conduit 155. Fuel will therefore be supplied to the ignition unit 25 and will continue to be so supplied until the left hand end of the piston 147 abuts the end portion 144 of the cylinder 145. At this time however, the ducting 151 will not communicate with the conduit 153 and no priming fuel will therefore be supplied to the burners 21, 22.

When the piston 147 abuts the end portion 144 of the cylinder 145, a tappet 163 carried by the piston 147 is in engagement with the tappet 112 of the valve member 108 and has forced the latter to the left to prevent flow through the drain conduit 105. Thus it is not until priming and ignition has occurred, that the fuel supply control unit 23 will be adjusted to supply the full flow of fuel to the reheat combustion equipment 20.

As will be appreciated, the arrangement described above ensures that the burners 21, 22 are primed a discrete time before ignition of the reheat fuel is effected, and that both priming and ignition occurs before the full flow of reheat fuel occurs. This is illustrated by the middle and the lower curves of FIG. 6 from which it will be seen that, when reheat is selected, and in the particular case illustrated, the priming flow lasts for the first 0.6 second and there is then an interval of 0.1 second during which there is neither primary flow nor ignition flow. Thereafter, and for the period 0.7 to 1.0 second after the selection of reheat, the ignition flow will occur.

As will be seen from the upper curve of FIG. 6, immediately reheat is selected the nozzle area is increased to a value (e.g. of 10%) above that corresponding to the percentage of reheat fuel employed, whereby any tendency to surging is reduced. However at the end of the first 3 seconds, the nozzle area is reduced to a value exactly corresponding to the percentage of reheat fuel employed.

I claim:
1. A gas turbine engine having a jet pipe, reheat combustion equipment mounted in said jet pipe, and a variable area nozzle mounted at the downstream end of the jet pipe, a fluid-operated device for varying the area of the nozzle, a pressure responsive device which normally controls operation of the fluid-operated device and which is adjusted in functional dependence upon the value of the jet pipe pressure, fuel supply means for supplying fuel to the reheat combustion equipment, and manually operable member for controlling operation of the fuel supply means, and fluid valve means, effective only during a predetermined period initiated by predetermined movement of the manually operable member, for preventing the pressure responsive device from controlling operation of the fluid-operated device and for ensuring that the latter is controlled by means of the said manually operable member.

2. An engine as claimed in claim 1 in which the said predetermined movement comprises movement of the manually operable member in a direction to increase the supply of fuel to the reheat combustion equipment, the area of the nozzle, throughout the said predetermined period, being greater than it would be if it remained under the control of the pressure responsive device.

3. An engine as claimed in claim 1 in which the said predetermined movement is constituted by any movement of the manually operable member.

4. An engine as claimed in claim 1 in which the pressure responsive device is responsive to the ratio of pressures which are respectively functionally related to the jet pipe pressure and to a pressure prevailing in the compressor of the engine.

5. A gas turbine engine having a jet pipe, reheat combustion equipment mounted in said jet pipe, and a variable area nozzle mounted at the downstream end of the jet pipe, a power-operated device for varying the area of the nozzle, a pressure responsive device which normally controls operation of the power-operated device and which is adjusted in functional dependence upon the value of the jet pipe pressure, fuel supply means for supplying fuel to the reheat combustion equipment, a manually operable member for controlling operation of the fuel supply means, control means, effective only during a predetermined period initiated by predetermined movement of the manually operable member, for preventing the pressure responsive device from controlling operation of the power-operated device and for ensuring that the latter is controlled by means of the said manually operable member, and, a servo device, said pressure responsive device controlling said power-operated device by way of said servo device, the control means rendering the servo device inoperative during a said predetermined period.

6. An engine as claimed in claim 5 in which the servo device is pressure fluid operated, the control means comprising a shut-off valve in a pressure fluid supply line leading to the servo device, the said shut-off valve being closed throughout the said predetermined period.

7. An engine as claimed in claim 6 in which the shut-off valve is constituted by first and second parts which are respectively connected to the manually operable member and to the power-operated device, movement of the first part urging a servo member to adjust the second part until the latter has moved to the same extent and in the same sense as the first part.

8. An engine as claimed in claim 7 in which movement of the manually operable member from a first position, in which no fuel is supplied to the reheat combustion equipment, to a second position, in which fuel is supplied to the reheat combustion equipment, causes priming of the said reheat combustion equipment with fuel and subsequent ignition of the said fuel.

9. An engine as claimed in claim 8 in which there is an interval between the said priming and the said ignition.

10. An engine as claimed in claim 8 comprising a reservoir, means for filling the reservoir with a predetermined quantity of fuel whenever the manually operable member is in the first position, and means for passing fuel from said reservoir to effect the said priming and the said ignition whenever the manually operable member is moved from the said first position to the said second position.

11. An engine as claimed in claim 10 in which the reservoir comprises a cylinder having a piston slidable therein, there being provided means urging the piston towards one end portion of the cylinder, through which end portion the reservoir may be filled with the said quantity of fuel, and there being ducting leading from the said end portion to other portions of the cylinder, which other portions, when the piston is in certain positions, respectively communicate with conduits leading to an ignition unit and to the reheat combustion equipment.

12. An engine as claimed in claim 11 in which there is a valve member which permits flow through the ducting and towards the said other portions only when the manually operable member is in the said second position, movement of the manually operable member effecting movement of the valve member.

13. An engine as claimed in claim 12 in which, when the manually operable member is in the first position, it establishes communication between two fuel conduits to permit the latter to supply fuel to the reservoir.

14. An engine as claimed in claim 11 in which means are provided for preventing the full flow of fuel to the reheat combustion equipment being established until the said priming and ignition has occurred.

15. An engine as claimed in claim 14 in which the last mentioned means prevent the servo member from fully adjusting the said second part of the shut-off valve until the said priming and ignition has occurred.

16. An engine as claimed in claim 15 in which the said last mentioned means comprises a normally open trip valve in a drain conduit, the trip valve being closed by the said piston when the latter is at the said one end of its cylinder.

17. An engine as claimed in claim 5 in which the said predetermined movement comprises movement of the manually operable member in a direction to increase the supply of fuel to the reheat combustion equipment, the area of the nozzle, throughout the said predetermined period, being greater than it would be if it remained under the control of the pressure responsive device.

18. An engine as claimed in claim 5 in which the said predetermined movement is constituted by any movement of the manually operable member.

19. An engine as claimed in claim 5 in which the pressure responsive device is responsive to the ratio of pressures which are respectively functionally related to the jet pipe pressure and to a pressure prevailing in the compressor of the engine.

References Cited

UNITED STATES PATENTS

| | | | |
|---|---|---|---|
| 2,818,703 | 1/1958 | Victor | 60—235 |
| 2,984,969 | 5/1961 | Torell | 60—242 X |
| 2,715,311 | 8/1955 | Coar | 60—242 |
| 2,780,054 | 2/1957 | Coar et al. | 60—242 X |
| 3,021,668 | 2/1962 | Longstreet | 60—242 X |
| 3,091,080 | 5/1963 | Crim et al. | 60—241 X |
| 3,331,204 | 7/1967 | Love | 60—241 X |

FOREIGN PATENTS 224,652 10/1959 Australia.

A. LAWRENCE SMITH, Primary Examiner

U.S. Cl. X.R.

60—241, 242